United States Patent
Moon et al.

(10) Patent No.: US 11,893,771 B2
(45) Date of Patent: Feb. 6, 2024

(54) IMAGE ACQUISITION APPARATUS, IMAGE ACQUISITION METHOD, AND ELECTRONIC DEVICE INCLUDING THE SAME

(71) Applicant: SAMSUNG ELECTRONICS CO., LTD., Suwon-si (KR)

(72) Inventors: Junhyuk Moon, Suwon-si (KR); Hyochul Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/746,356

(22) Filed: May 17, 2022

(65) Prior Publication Data

US 2023/0117639 A1    Apr. 20, 2023

(30) Foreign Application Priority Data

Oct. 14, 2021    (KR) .................. 10-2021-0136896

(51) Int. Cl.
   *G06V 10/60*    (2022.01)
   *G06V 10/58*    (2022.01)

(52) U.S. Cl.
   CPC .............. *G06V 10/58* (2022.01); *G06V 10/60* (2022.01)

(58) Field of Classification Search
   CPC .......................... G06V 10/58; G06V 10/60
   See application file for complete search history.

(56) References Cited

U.S. PATENT DOCUMENTS

| | | | |
|---|---|---|---|
| 6,958,729 B1 | 10/2005 | Metz | |
| 8,045,157 B2 | 10/2011 | Shibayama et al. | |
| 10,170,509 B2 | 1/2019 | Ockenfuss | |
| 11,119,215 B2* | 9/2021 | Bravo Orellana | G01S 17/931 |
| 2007/0013812 A1 | 1/2007 | Ajito et al. | |
| 2010/0208099 A1 | 8/2010 | Nomura | |
| 2011/0085708 A1* | 4/2011 | Martin | G06V 40/1324 382/115 |

(Continued)

FOREIGN PATENT DOCUMENTS

| | | |
|---|---|---|
| JP | 4217243 B2 | 1/2009 |
| KR | 10-2014-0144923 A | 12/2014 |

(Continued)

OTHER PUBLICATIONS

Huo, Jun-Yan et al., "Robust Automatic White Balance Algorithm using Gray Color Points in Images", IEEE Transactions on Consumer Electronics, vol. 52, No. 2, May 2006, pp. 541-546.

(Continued)

*Primary Examiner* — Syed Haider
(74) *Attorney, Agent, or Firm* — Sughrue Mion, PLLC

(57) ABSTRACT

Provided is an image acquisition apparatus including a first hyperspectral image sensor configured to obtain a first image, and a processor configured to process the first image obtained by the first hyperspectral image sensor, wherein the processor is further configured to extract a spectrum of each pixel of the first image obtained by the first hyperspectral image sensor, correct the spectrum by normalizing the spectrum of each pixel, distinguish an object from a background within the first image by recognizing a pattern of the spectrum of each pixel, and correct a color of the object and a color of the background by using a spatial distribution of illuminations.

15 Claims, 22 Drawing Sheets

(56) References Cited

U.S. PATENT DOCUMENTS

| | | |
|---|---|---|
| 2014/0061486 A1 | 3/2014 | Bao et al. |
| 2014/0193050 A1* | 7/2014 | Miller .................. G06T 5/50 |
| | | 382/128 |
| 2015/0144770 A1 | 5/2015 | Choi |
| 2016/0078317 A1* | 3/2016 | Gu ...................... G06V 10/60 |
| | | 382/190 |
| 2016/0269707 A1 | 9/2016 | Yoshizaki |
| 2018/0045953 A1 | 2/2018 | Fan et al. |
| 2019/0004222 A1 | 1/2019 | Hwang et al. |
| 2019/0049296 A1 | 2/2019 | Cho et al. |
| 2019/0086259 A1 | 3/2019 | Cho |
| 2019/0187347 A1 | 6/2019 | Bilger et al. |
| 2019/0277693 A1 | 9/2019 | Kim et al. |
| 2020/0314983 A1 | 10/2020 | Park et al. |
| 2021/0033466 A1 | 2/2021 | Kim et al. |
| 2021/0127101 A1 | 4/2021 | Roh et al. |
| 2021/0174490 A1 | 6/2021 | Nipe et al. |
| 2021/0208279 A1* | 7/2021 | Bravo Orellana ...... G01S 17/66 |
| 2022/0003906 A1 | 1/2022 | Kim et al. |

FOREIGN PATENT DOCUMENTS

| | | |
|---|---|---|
| KR | 10-1743151 B1 | 6/2017 |
| KR | 10-2018-0015067 A | 2/2018 |
| KR | 10-2020-0018640 A | 2/2020 |

OTHER PUBLICATIONS

Malacara, Daniel, "Color Vision and Colorimetry : Theory and Applications", Second Edition, SPIE Press, 2011. (186 pages total).

* cited by examiner

| s1 | s2 | s3 | s4 |
|----|----|----|----|
| s5 | s6 | s7 | s8 |
| s9 | s10 | s11 | s12 |
| s13 | s14 | s15 | s16 |

IMAGE ACQUISITION APPARATUS, IMAGE ACQUISITION METHOD, AND ELECTRONIC DEVICE INCLUDING THE SAME

CROSS-REFERENCE TO RELATED APPLICATION

This application claims priority to Korean Patent Application No. 10-2021-0136896, filed on Oct. 14, 2021, in the Korean Intellectual Property Office, the disclosure of which is incorporated by reference herein in its entirety.

BACKGROUND

1. Field

Example embodiments of the present disclosure relate to an image acquisition apparatus, an image acquisition method, and an electronic device including the same.

2. Description of Related Art

When a person sees an object, the person recognizes lighting illuminating an object and then recognizes the spectrum of light reflected by the object as the color of the object. Correction of color in a person's color recognition according to such a change in the surrounding environment is referred to as chromatic adaptation. The colors of objects that people remember on a daily basis, such as human skin and hair color, white paper, and white wedding dresses, are perceived differently according to changes in lighting, and accordingly people feel color inconstancy of an object. The color of an image obtained by an image sensor is the color of an object in which the color of lighting is reflected. For this reason, correction due to color adaptation and correction of color inconsistency are needed. To this end, it is necessary to measure or estimate an illumination spectrum on each object surface within an image.

In general, methods of obtaining illumination from an image obtained by a camera involve measurement of an average spectrum of light entering a sensor or estimation of illumination from average color information of an image obtained by the sensor. However, in principle, in a method of measuring or estimating a single illumination, the spatial distribution of illumination for correcting color adaptation and color inconstancy of an object under multiple illuminations cannot be accurately measured or estimated.

SUMMARY

One or more example embodiments provide image acquisition apparatus and method capable of effectively distinguishing an object from a background and estimating a spatial change in an illumination spectrum, and an electronic device including the same.

Additional aspects will be set forth in part in the description which follows and, in part, will be apparent from the description, or may be learned by practice of example embodiments of the disclosure.

According to an aspect of an example embodiment, there is provided an image acquisition apparatus including a first hyperspectral image sensor configured to obtain a first image, and a processor configured to process the first image obtained by the first hyperspectral image sensor, wherein the processor is further configured to extract a spectrum of each pixel of the first image obtained by the first hyperspectral image sensor, correct the spectrum by normalizing the spectrum of each pixel, distinguish an object from a background within the first image by recognizing a pattern of the spectrum of each pixel, and correct a color of the object and a color of the background by using a spatial distribution of illuminations.

The processor may be further configured to obtain an average value of the spectrum of each pixel, consider the obtained spectrum as an average illumination spectrum of the entire first image, and correct the spectrum by normalizing the spectrum of each pixel.

The image acquisition apparatus may further include a second hyperspectral image sensor configured to obtain a second image, wherein the processor is further configured to obtain an average value of a spectrum of each pixel of the second image obtained by the second hyperspectral image sensor, and apply the average value of the spectrum of each pixel of the second image obtained by the second hyperspectral image sensor to an illumination spectrum used to correct the spectrum by normalizing the spectrum of each pixel.

The processor may be further configured to analyze a spatial distribution of an illumination on a background formed of a same material.

The image acquisition apparatus may further include an illumination sensor configured to analyze the spatial distribution of the illumination.

The illumination sensor may include a radar sensor configured to calculate the spatial distribution of the illumination based on location by measuring a material distribution within a three-dimensional (3D) space.

The processor may be further configured to analyze a spatial distribution of an illumination on a background formed of a same material.

The image acquisition apparatus may further include an illumination sensor configured to analyze the spatial distribution of the illumination.

The illumination sensor may include a radar sensor configured to obtain the spatial distribution of the illumination based on location by measuring a material distribution within a three-dimensional (3D) space.

According to another aspect of an example embodiment, there is provided an electronic device including an image acquisition apparatus including a first hyperspectral image sensor configured to obtain a first image, and a processor configured to process the first image obtained by the first hyperspectral image sensor, wherein the processor is further configured to extract a spectrum of each pixel of the first image obtained by the first hyperspectral image sensor, correct the spectrum by normalizing the spectrum of each pixel, distinguish an object from a background within the first image by recognizing a pattern of the spectrum of each pixel, and correct a color of the object and a color of the background by using a spatial distribution of illuminations The electronic device may include a mobile phone, a smartphone, a tablet, a smart tablet, a digital camera, a camcorder, a notebook computer, a television, a smart television, a smart refrigerator, a security camera, a robot, or a medical camera.

According to another aspect of an example embodiment, there is provided an image acquisition method including obtaining a first image by using a first hyperspectral image sensor, and processing the first image obtained by the first hyperspectral image sensor, wherein the processing of the obtained first image includes extracting a spectrum of each pixel of the first image obtained by the first hyperspectral image sensor, correcting the spectrum by normalizing the spectrum of each pixel, distinguishing an object from a background within the first image by recognizing a pattern of the spectrum of each pixel, and correcting a color of the object and a color of the background based on a spatial distribution of illuminations.

The correcting of the spectrum by normalizing the spectrum of each pixel may include obtaining an average value of the spectrum of each pixel, considering the obtained spectrum as an average illumination spectrum of the entire first image, and applying the obtained spectrum as an illumination average value.

The image acquisition method may further include obtaining a second image based on a second hyperspectral image sensor, wherein an average value of a spectrum of each pixel of the second image is applied as an illumination average value to correct the spectrum by normalizing the spectrum of each pixel.

The image acquisition method may further include analyzing the spatial distribution of the illumination.

The image acquisition method may further include measuring a material distribution within a three-dimensional (3D) space by a radar sensor to obtain the spatial distribution of the illumination based on location.

The image acquisition method may further include analyzing a spatial distribution of an illumination on a background formed of a same material, by using the radar sensor and the second hyperspectral image sensor.

The image acquisition method may further include analyzing a spatial distribution of an illumination on a background formed of a same material.

The image acquisition method may further include analyzing the spatial distribution of the illumination by using an illumination sensor.

The illumination sensor may include a radar sensor configured to obtain the spatial distribution of the illumination based on location by measuring a material distribution within a three-dimensional (3D) space.

BRIEF DESCRIPTION OF THE DRAWINGS

The above and/or other aspects, features, and advantages of example embodiments will be more apparent from the following description taken in conjunction with the accompanying drawings, in which:

FIG. 4 illustrates one pixel of FIG. 3;

DETAILED DESCRIPTION

Figure 1:
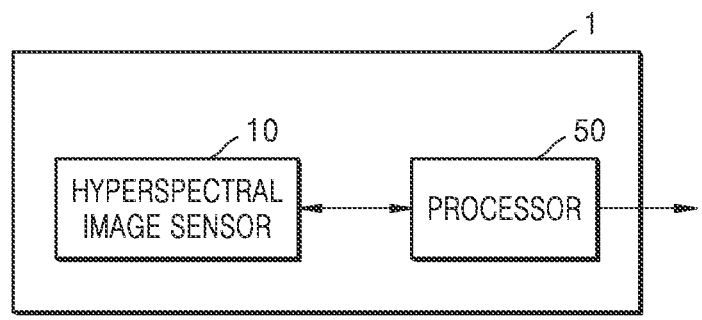
FIG. 1 is a schematic block diagram of an image acquisition apparatus according to an example embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "one or more of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Example embodiments will now be described more fully with reference to the accompanying drawings. Like reference numerals in the drawings denote like elements, and, in the drawings, the sizes of elements may be exaggerated for clarity and for convenience of explanation. In this regard, the present embodiments may have different forms and should not be construed as being limited to the descriptions set forth herein.

When a layer is referred to as being "on" another layer or substrate, it can be directly on/below/on the left side of/on the right side of the other layer or substrate, or intervening layers may also be present. An expression used in the singular encompasses the expression of the plural, unless it has a clearly different meaning in the context. The terms "comprises" and/or "comprising" or "includes" and/or "including" when used in this specification, specify the presence of stated elements, but do not preclude the presence or addition of one or more other elements.

The use of the terms "a" and "an" and "the" and similar referents are to be construed to cover both the singular and the plural. The operations that constitute a method described herein can be performed in any suitable order unless otherwise indicated herein or otherwise clearly contradicted by context, but embodiments are not limited to the stated order.

The terms "unit", "-er (-or)", and "module" when used in this specification refers to a unit in which at least one function or operation is performed, and may be implemented as hardware, software, or a combination of hardware and software.

The connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of any and all examples, or exemplary language provided herein, is intended merely to better illuminate the inventive concept and does not pose a limitation on the scope of the present disclosure unless otherwise claimed.

In order to analyze multiple illumination components, it is necessary to analyze an illumination on the same object to obtain a spatial distribution of the illumination. To this end, it is necessary to separate an object and a background from an image in advance.

RGB-based color information is a value integrated over all wavelengths by multiplying the reflection spectrum of an object by color-matching functions, and detailed information of the reflection spectrum of the object is lost. As such, when there are various illuminations, it is difficult to estimate the object's own reflection spectrum because an illumination spectrum is reflected in the RGB color information, and thus it is difficult to effectively distinguish the object from the background in the image by only using a color and a shape.

An image acquisition apparatus and method according to an example embodiment applies hyperspectral imaging technology to separate an object and a background from an image. In the image acquisition apparatus and method according to an example embodiment, multiple illumination components may be analyzed by analyzing an illumination on the same object and obtaining a spatial distribution of the illumination.

The hyperspectral imaging technology is a technology for simultaneously measuring an image of an object and a continuous light spectrum for each point in the image. The hyperspectral imaging technology may measure the light spectrum of each part of an object within a short period of time, compared to conventional spot spectroscopy.

In this hyperspectral imaging technology, traditionally, an image and a spectrum are obtained at the same time by dispersing the light passed through a narrow aperture by using a grating or the like, as in a point-scan method (i.e., a whisker-broom method) or a line scan method (i.e., a push-broom method). Recently, a snapshot method of simultaneously capturing images for each wavelength band by combining a bandpass filter array or a tunable filter on an image sensor has also been introduced.

Because each pixel in an image obtained by an image acquisition apparatus implementing this hyperspectral imaging technology contains spectral information, various applications are possible for measuring the properties and characteristics of an object by remotely capturing an image. For example, hyperspectral imaging technology may be applied to analysis of agricultural site conditions, mineral distribution, surface vegetation, and pollution levels obtained by taking ground shots from drones, satellites, aircraft, and the like. Application of hyperspectral imaging technology is being reviewed in various fields such as food safety, skin/face analysis, authentication recognition, and biological tissue analysis.

Hyperspectral imaging technology may also be employed in various high-performance optical devices or high-performance electronic devices. Such electronic devices may be, but is not limited to, a smartphone, a portable phone, a mobile phone, a personal digital assistant (PDA), a laptop, a personal computer (PC), various portable devices, home appliances, security cameras, medical cameras, automobiles, an Internet of Things (IoT) device, and other mobile or non-mobile computing devices.

FIG. 1 is a schematic block diagram of an image acquisition apparatus 1 according to an example embodiment.

Referring to FIG. 1, the image acquisition apparatus 1 according to an example embodiment is provided to obtain an image according to hyperspectral imaging. The image acquisition apparatus 1 may include a hyperspectral image sensor 10, and a processor 50 for processing an image acquired by the hyperspectral image sensor 10. The processor 50 extracts the spectrum of each pixel of the image obtained by the hyperspectral image sensor 10, and corrects the spectrum by normalizing the spectrum of each pixel, distinguishes an object from a background within the image by recognizing a pattern of the spectrum of each pixel, and corrects the color of the object and the background by using the spatial distribution of illuminations.

Figure 2:
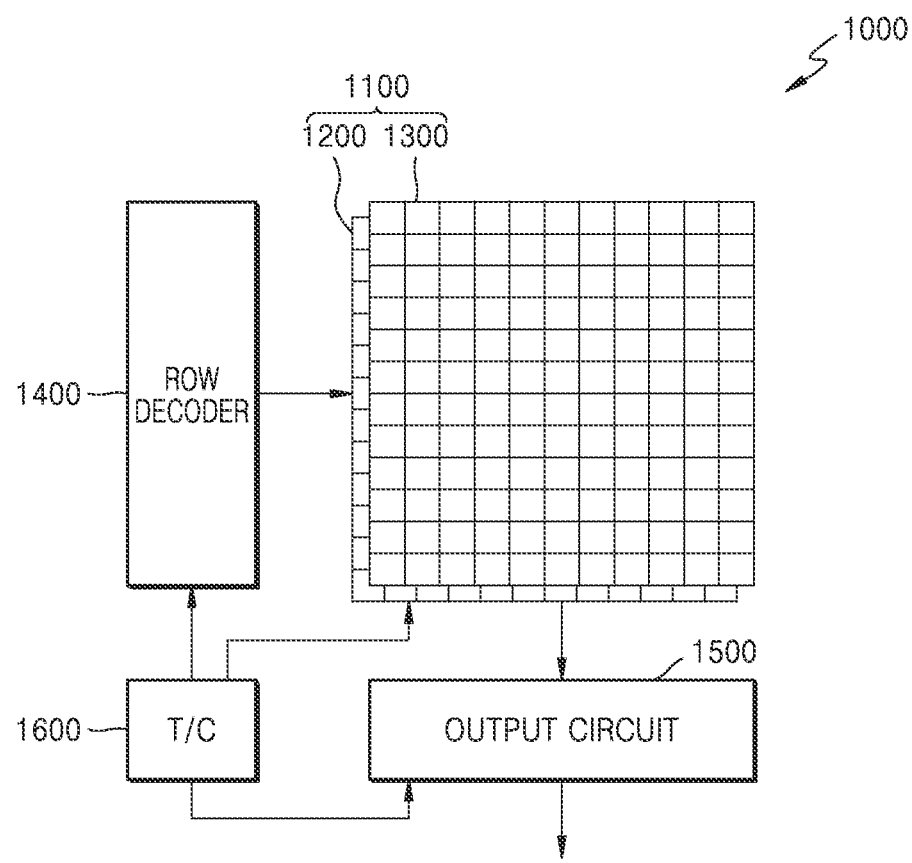
FIG. 2 illustrates a hyperspectral image sensor applicable to an image acquisition apparatus according to an example embodiment.

FIG. 2 illustrates a hyperspectral image sensor 1000 that may be applied to an image acquisition apparatus according to an example embodiment. The hyperspectral image sensor 1000 exemplarily shown in FIG. 2 is applicable to the image acquisition apparatus 1, and is applicable to image acquisition apparatuses 100, 200, and 300 according to other example embodiments, which will be described later, and electronic devices using the image acquisition apparatuses 100, 200, and 300.

Referring to FIG. 2, the hyperspectral image sensor 1000 may include a pixel array 1100, a timing controller 1600, a row decoder 1400, and an output circuit 1500.

The pixel array 1100 of the hyperspectral image sensor 1000 may include a plurality of pixels arranged in a two-dimensional (2D) manner, and each of the plurality of pixels may include a plurality of subpixels arranged in an n×n (where n is an integer equal to or greater than 3) array to sense light of different wavelength bands in which center wavelengths are different.

The pixel array 1100 may be, for example, a combination of a sensing unit 1200 and a spectral filter 1300. FIG. 2 illustrates that the sensing unit 1200 and the spectral filter 1300 that form the pixel array 1100 are separated from each other, but embodiments are not limited thereto. The pixel array 1100 may be, for example, a stack of the sensing unit 1200 and the spectral filter 1300. The sensing unit 1200 may form a sensing region in correspondence with an array of the pixels and the subpixels of the pixel array 1100. The spectral filter 1300 may have a 2D layout of filter regions provided to transmit light of different wavelength ranges in which central wavelengths are different, in correspondence with an arrangement of the subpixels of each pixel.

The row decoder 1400 may select one or two or more of the rows of the pixel array 1100 in response to a row address signal output from the timing controller 1600. The output circuit 1500 outputs a light detection signal in units of columns from the plurality of pixels arranged in a selected row. To this end, the output circuit 1500 may include a column decoder and an analog to digital converter (ADC). For example, the output circuit 1500 may include a plurality of ADCs arranged for each column between the column decoder and the pixel array 1100, or a single ADC arranged at an output end of the column decoder. The timing controller 1600, the row decoder 1400, and the output circuit 1500 may be implemented by a single chip or separate chips. The processor 50 for processing an image signal output through the output circuit 1500 may be implemented by a single chip together with the timing controller 1600, the row decoder 1400, and the output circuit 1500. Each of the plurality of pixels of the pixel array 1100 may include a plurality of subpixels that detect light of different central wavelength bands, and an arrangement of the subpixels may be implemented in various methods.

Figure 3:
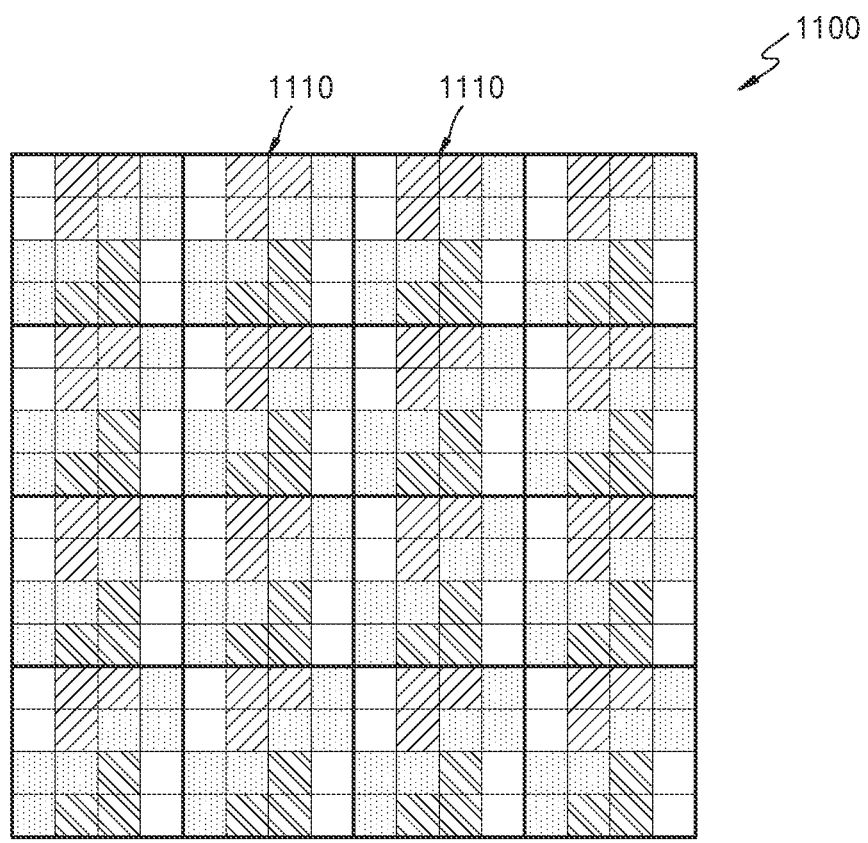
FIG. 3 illustrates a pixel array of a hyperspectral image sensor according to an example embodiment.

FIG. 3 illustrates the pixel array 1100 of the hyperspectral image sensor 1000 according to an example embodiment.

Referring to FIG. 3, the pixel array 1100 of the hyperspectral image sensor 1000 may include a plurality of pixels arranged in a 2D manner, and each of the plurality of pixels may include a plurality of subpixels arranged in an n×n (where n is an integer equal to or greater than 3) array to sense light of different wavelength bands in which center wavelengths are different.

For example, the pixel array 1100 of the hyperspectral image sensor 1000 may include a plurality of blue subpixels in which light in a blue light region having different central wavelengths is sensed, a plurality of green subpixels in which light in a green light region having different central wavelengths is sensed, a plurality of red subpixels in which light in a red light region having different central wavelengths is sensed, one or more near-infrared subpixels in which near-infrared light is sensed, and one or more ultraviolet subpixels in which ultraviolet light is sensed.

Each pixel of the hyperspectral image sensor 1000 may include a plurality of subpixels to sense light in regions having different central wavelengths, and the plurality of subpixels may be arranged in, for example, a 3×3, 4×4, or 5×5 array form. FIG. 3 shows an example in which the subpixels of each pixel are arranged in a 4×4 array form.

Figure 5:
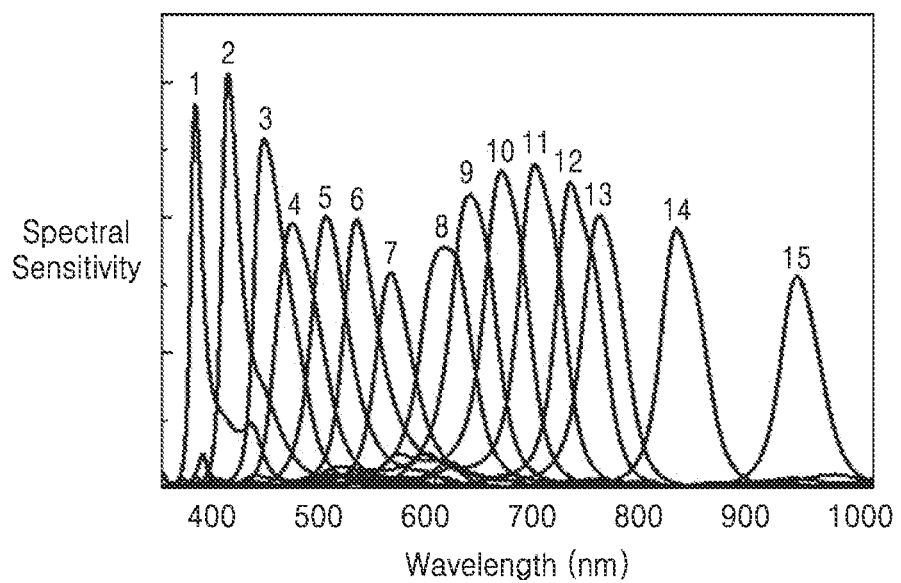
FIG. 5 illustrates spectral sensitivity according to the wavelength of each subpixel of FIG. 4.

FIG. 4 exemplarily illustrates one pixel of FIG. 3, and FIG. 5 exemplarily illustrates spectral sensitivity according to the wavelength of each subpixel of FIG. 4. In FIG. 4, s1, s2, . . . , s15, and s16 indicate subpixels.

As illustrated in FIGS. 4 and 5, the pixel array 1100 of the hyperspectral image sensor 1000 may include a plurality of pixels arranged in a 2D, and each of the plurality of pixels may include, for example, 16 subpixels arranged in a 4×4 array form.

In FIG. 4, the subpixels s1, s2, . . . , and s15 may sense light of different wavelength bands in which central wavelengths are different, and the subpixel s16 may correspond to a white channel. Numbers 1, 2, . . . , and 15 on spectral sensitivity plots of FIG. 5 indicate the subpixels s1, s2, . . . , and s15 of FIG. 4.

As can be seen from the spectral sensitivity plots of FIG. 5, the hyperspectral image sensor 1000 may sense light of different wavelength bands in which central wavelengths are different, for each spectrum, by configuring each pixel of the pixel array 1100 to include a plurality of subpixels arranged in an n×n (where n is an integer greater than or equal to 3) array.

Because the hyperspectral image sensor 1000 may perform hyperspectral sensing, it is possible to simultaneously acquire an image and a spectrum.

Figure 6:
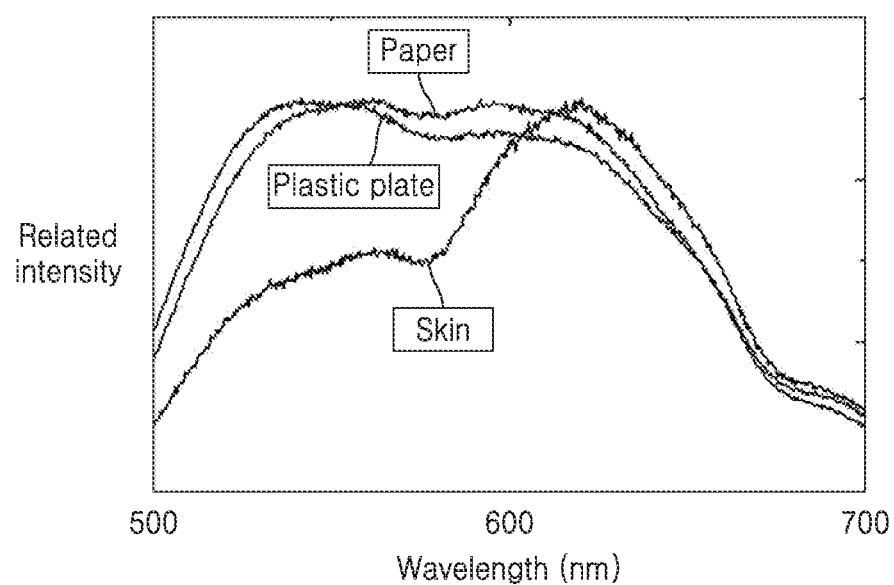
FIG. 6 is a graph showing the reflection spectrum characteristics of various objects measured by a hyperspectral image sensor.

FIG. 6 is a graph showing the reflection spectrum characteristics of various objects measured by the hyperspectral image sensor 1000. FIG. 6 shows results of extracting spectra by measuring images of white paper, a white plastic plate, and skin by using a hyperspectral sensor under 5,500K LED lighting. In FIG. 6, the horizontal axis indicates a wavelength, and the vertical axis indicates the intensity of an image for each wavelength.

As can be seen from FIG. 6, the reflection spectrum of an object has a unique pattern. Because the same object has the same reflection spectrum, a spatial change in an illumination spectrum may be effectively estimated in the same object or the background of the same material.

Therefore, when hyperspectral sensing technology is applied, the same object or the background of the same material may be effectively distinguished.

Figure 8:
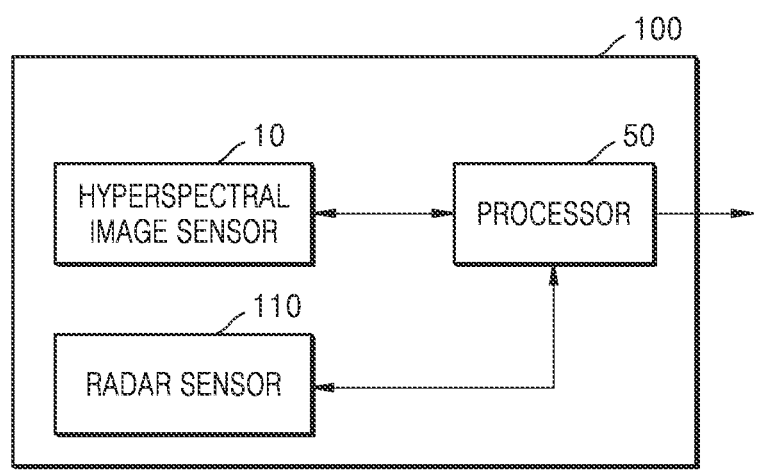
FIGS. 8, 9, and 10 are schematic block diagrams of image acquisition apparatuses according to other example embodiments.
Figure 9:
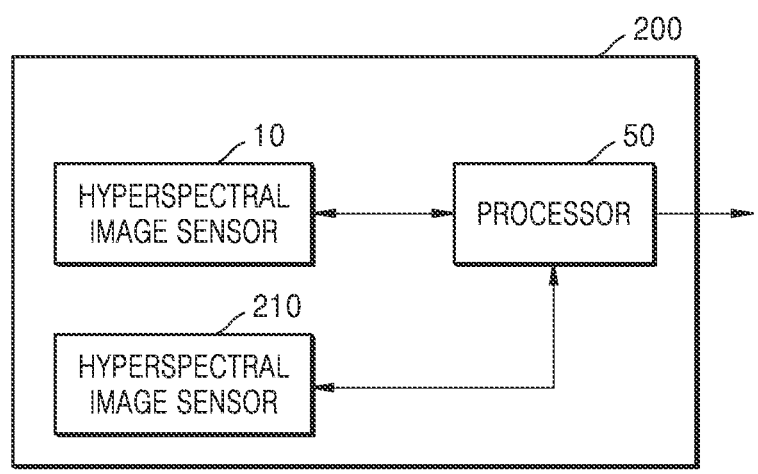
Figure 10:
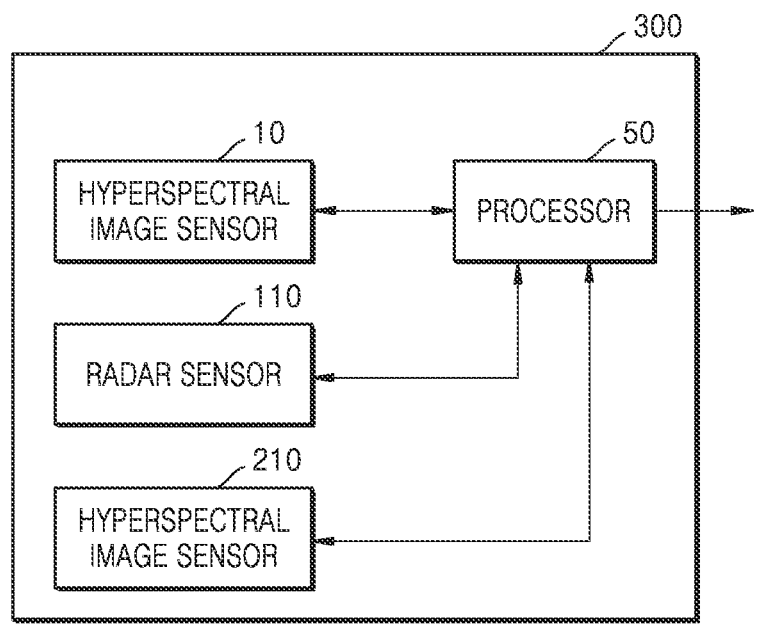

The hyperspectral image sensor 1000 described above with reference to FIGS. 2 through 6 are applicable as hyperspectral image sensors 10 included in the image acquisition apparatus 1 of FIG. 1 and the image acquisition apparatuses 100, 200, and 300 of FIGS. 8 through 10.

Referring back to FIG. 1, the image acquisition apparatus 1 according to an example embodiment separates the object from the background by processing the image obtained by the hyperspectral image sensor 10 by using the processor 50, analyzes multiple illumination components by analyzing the lighting illuminating the same object and obtaining a spatial distribution of the lighting, and corrects the color of the object and the background by using the analyzed multiple illumination components.

To this end, the processor 50 extracts the spectrum of each pixel of the image obtained by the hyperspectral image sensor 10, corrects the spectrum by normalizing the spectrum of each pixel, and distinguishes the object from the background within the image by recognizing a pattern of the spectrum of each pixel. According to the example embodiment, the processor 50 calculates (obtains) an average value of the spectrum of each pixel, considers the calculated spectrum as an average illumination spectrum of the entire image, and corrects the spectrum by normalizing the spectrum of each pixel by using the average illumination spectrum. The processor 50 analyzes the spatial distribution of the illumination on the background formed of the same material, and corrects the colors of the object and the background by using the spatial distribution of illuminations.

Figure 7:
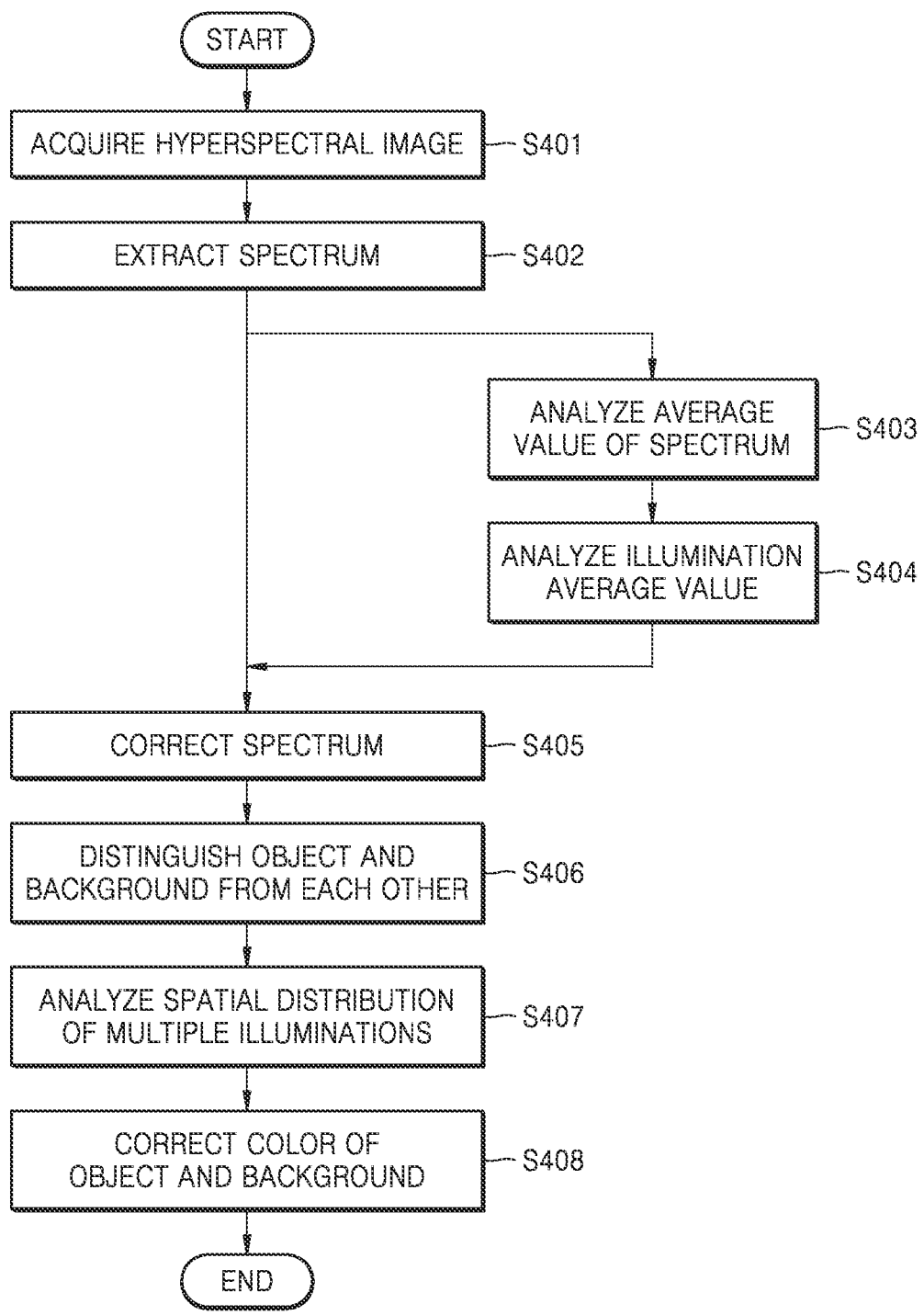
FIG. 7 illustrates a process of acquiring and processing a hyperspectral image by using an image acquisition apparatus according to an example embodiment.

FIG. 7 illustrates a process of acquiring and processing a hyperspectral image by using the image acquisition apparatus 1 according to an example embodiment.

Referring to FIG. 7, hyperspectral image acquisition is performed using the hyperspectral image sensor 10 (S401). The image acquired by the hyperspectral image sensor 10 may be processed by the processor 50 (S402, S405, S406, S407, and S408). The spectrum of each pixel of the acquired image may be extracted (S402), and the spectrum may be corrected by normalizing the spectrum of each pixel (S405). For spectrum correction, an average value of the spectrum of each pixel may be calculated (S403), and the calculated spectrum may be considered as an illumination average value, that is, an overall average illumination spectrum (S404). The spectrum may be corrected by normalizing the spectrum of each pixel using the obtained illumination spectrum (S405).

Then, the object and the background within the image may be separated by recognizing the pattern of each pixel spectrum (S406), the background formed of the same material may be distinguished and the spatial distribution of illuminations, that is, multiple illuminations may be analyzed (S407). When the image acquisition apparatus 1 of FIG. 1 is applied, the spatial distribution analysis of illuminations in operation S407 may be performed for the background formed of the same material, which is identified by recognizing the pattern of each pixel spectrum. The color of the object and the background may be corrected using the obtained spatial distribution of the illuminations (S408).

In an image acquisition apparatus and an image acquisition method according to an example embodiment, because the color of the object and the background may be corrected using the spatial distribution of illuminations, an image in which a color changed by illumination is corrected to be close to a color perceived by a person may be obtained.

FIG. 8 illustrates the image acquisition apparatus 100 according to another example embodiment. Compared with FIG. 1, the image acquisition apparatus 100 further includes an illumination sensor for analyzing the spatial distribution of an illumination.

Referring to FIG. 8, a radar sensor 110 may be included as the illumination sensor. The radar sensor 110 may calculate a spatial distribution of the illumination according to an image location by measuring a material distribution within a three-dimensional (3D) space and combining the measured material distribution with an image measured by the hyperspectral image sensor 10. The radar sensor 110 may be located in the same direction as the hyperspectral image sensor 10 in order to combine an image obtained by the hyperspectral image sensor 10 with a distance distribution of objects within an image obtained by the radar sensor 110.

For example, the radar sensor 110 may measure the material distribution within the 3D space, a result of the measurement may be transmitted to the processor 50, and the processor 50 may calculate the spatial distribution of the illumination according to location. The processor 50 may analyze a spatial distribution of illuminations, that is, multiple illuminations, by using the spatial distribution of the illumination according to a location sensed by the illumination sensor such as the radar sensor 110.

FIG. 8 illustrates an example in which the radar sensor 110 is included as the illumination sensor, but embodiments are not limited thereto. The spatial distribution of the illumination according to the location may be obtained by using a different type of illumination sensor from the radar sensor 110.

Even when the image acquisition apparatus 100 according to the example embodiment is applied, the method of FIG. 7 may be applied to a process of acquiring and processing the hyperspectral image. Compared with when the image acquisition apparatus 1 of FIG. 1 is applied, only operation S407 may be changed.

For example, when the illumination sensor is included, detection of the illumination's spectrum according to the location and analysis of the illumination's spatial distribution may be performed in operation S407, or may be performed in any operation before operation S408 of color correction of the object and the background, and the spatial distribution of illuminations may be analyzed using a result of detecting the illumination sensor instead of using the pattern of each pixel spectrum of the image obtained by the hyperspectral image sensor 10.

FIG. 9 schematically illustrates the image acquisition apparatus 200 according to another example embodiment. Compared with FIG. 1, the image acquisition apparatus 200 further includes an additional sensor for acquiring an illumination spectrum applied to correct a spectrum. FIG. 9 illustrates an example in which the hyperspectral image sensor 210 is included as the additional sensor, but embodiments are not limited thereto. The image acquisition apparatus 200 may include a different type of sensor from the hyperspectral image sensor 210 in order to acquire the illumination spectrum.

Referring to FIG. 9, the hyperspectral image sensor 210 may acquire an image for spectrum correction. The hyperspectral image sensor 210 may be located in a different direction from the hyperspectral image sensor 10 in order to exclude light reflected by an object.

When the hyperspectral image sensor 210 is further included in addition to the hyperspectral image sensor 10, the processor 50 may extract a spectrum from the image acquired by the hyperspectral image sensor 210, and calculate an average value of the spectra of the pixels of the image. The average value of the spectrum of each pixel of the image acquired by the hyperspectral image sensor 210 may be applied as an illumination spectrum used to correct a spectrum for the image acquired by the hyperspectral image sensor 10 by normalizing the spectrum of each pixel. A process of obtaining the illumination spectrum from the image acquired by the hyperspectral image sensor 210 may be performed through a separate processor, and an illumination spectrum result value processed through the special processor may be input to the processor 50 and may be applied to correct the spectrum for the image acquired by the hyperspectral image sensor 10. A case where a process of obtaining an illumination spectrum from the image acquired by the hyperspectral image sensor 210 is performed by the processor 50 will now be described.

Even when the image acquisition apparatus 200 according to the example embodiment is applied, the method of FIG. 7 may be applied to a process of acquiring and processing the hyperspectral image. Compared with when the image acquisition apparatus 1 of FIG. 1 is applied, operations S401 and S402 may be applied for the hyperspectral image sensor 10 and the hyperspectral image sensor 210, respectively, and operations S403 and S404 may be changed.

For example, when the image acquisition apparatus 1 of FIG. 1 is applied, an average value of the spectrum may be calculated by using the spectrum of each pixel extracted from the image acquired by the hyperspectral image sensor 10, and the spectrum may be corrected by normalizing the spectrum of each pixel by using the calculated spectrum as the illumination spectrum.

When the image acquisition apparatus 200 of FIG. 9 is applied, the illumination spectrum to be applied to spectrum correction may be obtained through addition application of operations S401 and S402 and operations S403 and S404 for a separate sensor, for example, the hyperspectral image sensor 210. The image may be acquired by additionally applying operations S401 and S402 to the hyperspectral image sensor 210, the spectrum of each pixel of the acquired image may be extracted, and the average value of the spectrum of each pixel may be calculated (S403), and the calculated spectrum may be considered as the illumination average value, that is, the average illumination spectrum of the entire image (S404). In operation S406, the obtained illumination spectrum may be applied to correct the spectrum extracted from the image acquired by the hyperspectral image sensor 10 (S405).

FIG. 10 schematically illustrates the image acquisition apparatus 300 according to another example embodiment. Compared with FIG. 1, the image acquisition apparatus 300 further includes an illumination sensor for analyzing the spatial distribution of an illumination, and an additional sensor for obtaining an illumination spectrum applied to correct a spectrum. FIG. 10 illustrates an example in which the radar sensor 110 is included as the illumination sensor and the hyperspectral image sensor 210 is included as the additional sensor, but embodiments are not limited thereto. The spatial distribution of the illumination according to the location may be obtained by using another type of illumination sensor other than the radar sensor 110. In addition, another type of sensor may be provided to acquire the illumination spectrum. Hereinafter, it will be described as an example that the radar sensor 110 is provided as the illumination sensor and the hyperspectral image sensor 210 is provided as the additional sensor for acquiring the illumination spectrum.

Referring to FIG. 10, the radar sensor 110 may measure the material distribution within the 3D space, a result of the measurement may be transmitted to the processor 50, and the processor 50 may calculate the spatial distribution of the illumination according to location. The processor 50 may analyze a spatial distribution of illuminations, that is, multiple illuminations, by using the spatial distribution of the illumination according to a location sensed by the illumination sensor such as the radar sensor 110. The hyperspectral image sensor 210 may acquire an image for spectrum correction. The processor 50 may extract a spectrum from the image acquired by the hyperspectral image sensor 210, and calculate an average value of the spectrum of each pixel of the image. The average value of the spectrum of each pixel of the image acquired by the hyperspectral image sensor 210 may be applied as an illumination spectrum used to correct a spectrum for the image acquired by the hyperspectral image sensor 10 by normalizing the spectrum of each pixel. A process of obtaining the illumination spectrum from the image acquired by the hyperspectral image sensor 210 may be performed through a separate processor, and an illumination spectrum result value may be input to the processor 50 and may be applied to correct the spectrum for the image acquired by the hyperspectral image sensor 10.

Even when the image acquisition apparatus 300 according to the example embodiment is applied, the method of FIG. 7 may be applied to a process of acquiring and processing the hyperspectral image. Similar to when the image acquisition apparatuses 100 and 200 of FIGS. 8 and 9 are applied, operations S401 and S402 may be applied for the hyperspectral image sensor 10 and the hyperspectral image sensor 210, respectively, operations S403 and S404 may be changed, and operation S407 may be changed.

As shown in FIG. 10, when the radar sensor 110 that measures the material distribution within the 3D space and calculates the spatial distribution of the illumination according to location is included and the additional sensor for acquiring the illumination spectrum applied to correct the spectrum, for example, the hyperspectral image sensor 210, is provided, the process may further include an operation of analyzing the spatial distribution of the illumination on the background formed of the same material by using the radar sensor 110 and the hyperspectral image sensor 210, and may further include an operation of analyzing the spatial distribution of the illumination by analyzing the spatial distribution of the illumination on the background formed of the same material.

The process of acquiring and processing the hyperspectral image when the image acquisition apparatus 300 according to the example embodiment is applied, may be sufficiently inferred from the process of acquiring and processing an image when the image acquisition apparatuses 100 and 200 of FIGS. 8 and 9 are applied, so a repeated description thereof will be omitted.

In image acquisition apparatuses and image acquisition methods according to various example embodiments as described above, an image is acquired using the hyperspectral image sensor 10, an object and a background within the image are distinguished from each other by recognizing a pattern of each pixel spectrum (S406), a background formed of the same material is distinguished and a spatial distribution of illuminations, that is, multiple illuminations, is analyzed (S407), and the color of the object and the background is corrected using the obtained spatial distribution of illuminations (S408).

Thus, in an image acquisition apparatus and an image acquisition method according to an example embodiment, it is possible to effectively estimate the color of the object and the background even under a multi-illumination environment.

The image acquisition apparatuses according to various example embodiments may be employed in various high-performance optical devices or high-performance electronic devices. Such electronic devices may be, but is not limited to, a smartphone, a portable phone, a mobile phone, a personal digital assistant (PDA), a laptop, a personal computer (PC), various portable devices, home appliances, security cameras, medical cameras, automobiles, an Internet of Things (IoT) device, and other mobile or non-mobile computing devices.

An electronic device may further include a processor, for example, an application processor (AP), for controlling the image acquisition apparatus 1, 100, 200, or 300, in addition to the image acquisition apparatus 1, 100, 200, or 300, and may drive an operating system or an application program through the processor to control a plurality of hardware or software components, and may perform a variety of data processing and calculations. The processor may further include a graphic processing unit (GPU) and/or an image signal processor. When the processor includes an image signal processor, an image acquired by an image acquisition apparatus may be stored and/or output by using the processor.

Figure 11:
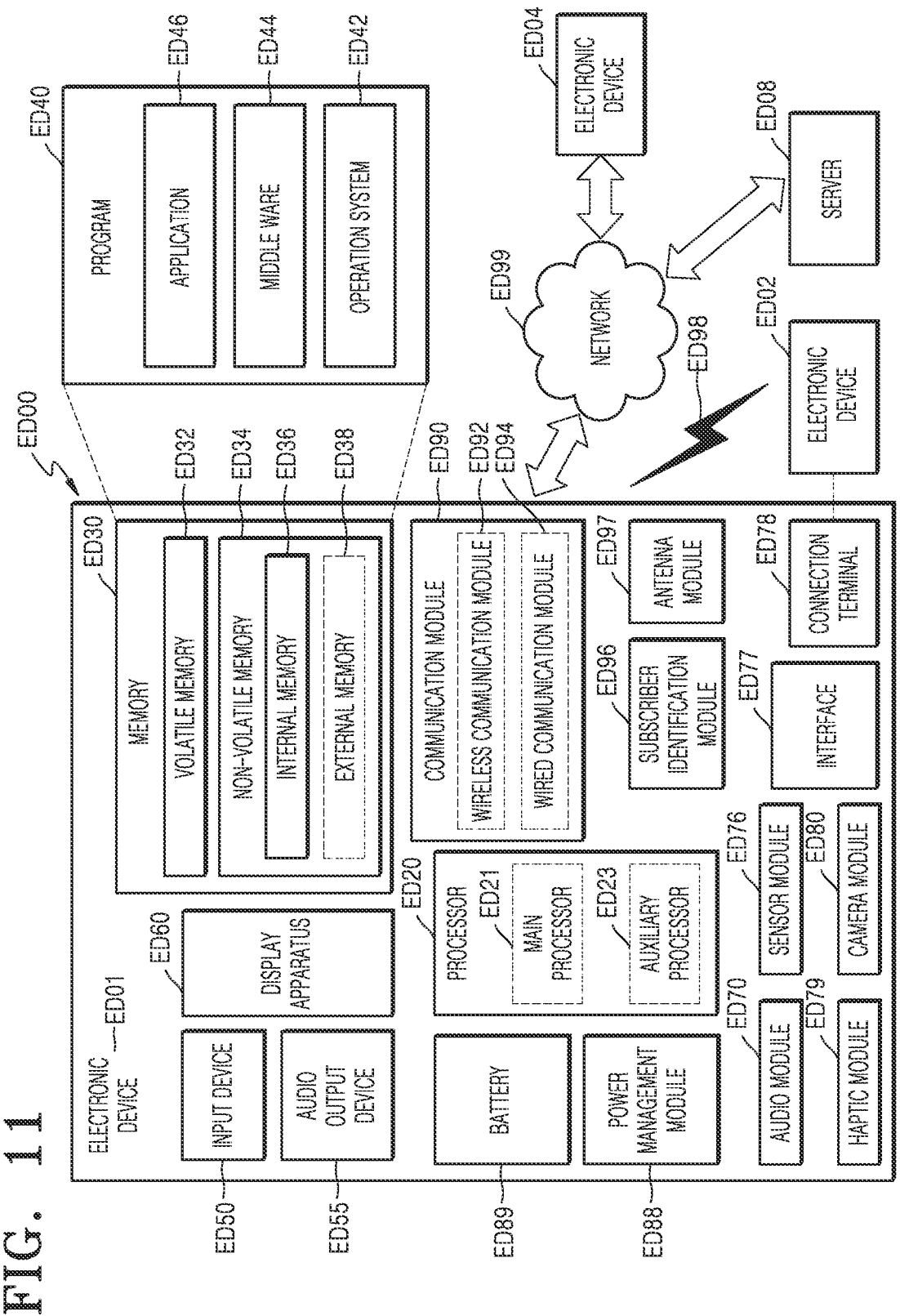
FIG. 11 is a block diagram illustrating an example of an electronic device including an image acquisition apparatus, according to an example embodiment.

FIG. 11 is a block diagram illustrating an example of an electronic device ED01 including the image acquisition apparatus 1, 100, 200, or 300, according to an example embodiment.

Referring to FIG. 11, in a network environment ED00, the electronic device ED01 may communicate with another electronic device ED02 through a first network ED98 (short-range wireless communication network, and the like), or communicate with another electronic device ED04 and/or a server ED08 through a second network ED99 (long-range wireless communication network, and the like). The electronic device ED01 may communicate with the electronic device ED04 via the server ED08. The electronic device ED01 may include a processor ED20, a memory ED30, an input device ED50, an audio output device ED55, a display apparatus ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (the display apparatus ED60, and the like) of the aforementioned components may be omitted or other components may be added. Some of the components may be implemented by one integrated circuit. For example, the sensor module ED76 (a fingerprint sensor, an iris sensor, an illuminance sensor, and the like) may be implemented by being embedded in the display apparatus ED60 (a display, and the like). Furthermore, when the image acquisition apparatus 1, 100, 200, or 300 includes a spectral function, some functions (a color sensor and an illuminance sensor) of the sensor module ED76 may be implemented by the image acquisition apparatus 1, 100, 200, or 300, not by a separate sensor module.

The processor ED20 may control one or a plurality of other components (hardware and software components, and the like) of the electronic device ED01 connected to the processor ED20 by executing software (a program ED40, and the like), and perform various data processing or calculations. As part of the data processing or calculations, the processor ED20 may load, in a volatile memory ED32, commands and/or data received from other components (the sensor module ED76, the communication module ED90, and the like), process the command and/or data stored in a volatile memory ED32, and store result data in a non-volatile memory ED34. The processor ED20 may include a main processor ED21 (a central processing unit, an application processor, and the like) and an auxiliary processor ED23 (a graphics processing unit, an image signal processor, a sensor hub processor, a communication processor, and the like) that is operable independently of or together with the main processor ED21. The auxiliary processor ED23 may use less power than the main processor ED21 and may perform a specialized function.

Instead of the main processor ED21 when the main processor ED21 is in an inactive state (sleep state), or with the main processor ED21 when the main processor ED21 is in an active state (application execution state), the auxiliary processor ED23 may control functions and/or states related to some components (the display apparatus ED60, the sensor module ED76, the communication module ED90, and the like) of the components of the electronic device ED01. The auxiliary processor ED23 (an image signal processor, a communication processor, and the like) may be implemented as a part of functionally related other components (the camera module ED80, the communication module ED90, and the like).

The memory ED30 may store various data needed by the components (the processor ED20, the sensor module ED76, and the like) of the electronic device ED01. The data may include, for example, software (the program ED40, and the like) and input data and/or output data about commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored in the memory ED30 as software, and may include an operating system ED42, middleware ED44, and/or an application ED46.

The input device ED50 may receive commands and/or data to be used for components (the processor ED20, and the like) of the electronic device ED01, from the outside (a user, and the like) of the electronic device ED01. The input device ED50 may include a microphone, a mouse, a keyboard, and/or a digital pen (a stylus pen, and the like).

The audio output device ED55 may output an audio signal to the outside of the electronic device ED01. The audio output device ED55 may include a speaker and/or a receiver. The speaker may be used for general purposes such as multimedia playback or recording playback, and the receiver can be used to receive incoming calls. The receiver may be implemented by being coupled as a part of the speaker or by an independent separate device.

The display apparatus ED60 may visually provide information to the outside of the electronic device ED01. The display apparatus ED60 may include a display, a hologram device, or a projector, and a control circuit to control a corresponding device. The display apparatus ED60 may include a touch circuitry set to detect a touch and/or a sensor circuit (a pressure sensor, and the like) set to measure the strength of a force generated by the touch.

The audio module ED70 may convert sound into electrical signals or reversely electrical signals into sound. The audio module ED70 may obtain sound through the input device ED50, or output sound through a speaker and/or a headphone of another electronic device (the electronic device ED02, and the like) connected to the audio output device ED55 and/or the electronic device ED01 in a wired or wireless manner.

The sensor module ED76 may detect an operation state (power, temperature, and the like) of the electronic device ED01, or an external environment state (a user state, and the like), and generate an electrical signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of specified protocols used for the electronic device ED01 to be connected to another electronic device (the electronic device ED02, and the like) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (the electronic device ED02, and the like). The connection terminal ED78 may include an HDMI connector, a USB connector, an SD card connector, and/or an audio connector (a headphone connector, and the like).

The haptic module ED79 may convert electrical signals into mechanical stimuli (vibrations, movements, and the like) or electrical stimuli that are perceivable by a user through tactile or motor sensations. The haptic module ED79 may include a motor, a piezoelectric device, and/or an electrical stimulation device.

The camera module ED80 may capture a still image and a video. The camera module ED80 may include a lens assembly including one or a plurality of lenses, the image acquisition apparatus 1, 100, 200, or 300 of FIGS. 1 and 8 through 10, image signal processors, and/or flashes. The lens assembly included in the camera module ED80 may collect light emitted from a subject for image capturing.

The power management module ED88 may manage power supplied to the electronic device ED01. The power management module ED88 may be implemented as a part of a power management integrated circuit (PMIC).

The battery ED89 may supply power to the components of the electronic device ED01. The battery ED89 may include non-rechargeable primary cells, rechargeable secondary cells, and/or fuel cells.

The communication module ED90 may establish a wired communication channel and/or a wireless communication channel between the electronic device ED01 and another electronic device (the electronic device ED02, the electronic device ED04, the server ED08, and the like), and support a communication through an established communication channel. The communication module ED90 may be operated independently of the processor ED20 (the application processor, and the like), and may include one or a plurality of communication processors supporting a wired communication and/or a wireless communication. The communication module ED90 may include a wireless communication module ED92 (a cellular communication module, a short-range wireless communication module, a global navigation satellite system (GNSS) communication module, and the like), and/or a wired communication module ED94 (a local area network (LAN) communication module, a power line communication module, and the like). Among the above communication modules, a corresponding communication module may communicate with another electronic device through the first network ED98 (a short-range communication network such as Bluetooth, WiFi Direct, or infrared data association (IrDA)) or the second network ED99 (a long-range communication network such as a cellular network, the Internet, or a computer network (LAN, WAN, and the like)). These various types of communication modules may be integrated into one component (a single chip, and the like), or may be implemented as a plurality of separate components (multiple chips). The wireless communication module ED92 may verify and authenticate the electronic device ED01 in a communication network such as the first network ED98 and/or the second network ED99 by using subscriber information (an international mobile subscriber identifier (IMSI), and the like) stored in the subscriber identification module ED96.

The antenna module ED97 may transmit signals and/or power to the outside (another electronic device, and the like) or receive signals and/or power from the outside. An antenna may include an emitter formed in a conductive pattern on a substrate (a printed circuit board (PCB), and the like). The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (an RFIC, and the like) than the antenna may be included as a part of the antenna module ED97.

Some of the components may be connected to each other through a communication method between peripheral devices (a bus, general purpose input and output (GPIO), a serial peripheral interface (SPI), a mobile industry processor interface (MIPI), and the like) and may mutually exchange signals (commands, data, and the like).

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices (ED02, ED04, and ED08). For example, when the electronic device ED01 needs to perform a function or service, the electronic device ED01 may request one or a plurality of electronic devices to perform part or the whole of the function or service, instead of performing the function or service. The one or a plurality of the electronic devices receiving the request may execute additional function or service related to the request, and transmit a result of the execution to the electronic device ED01. To this end, a cloud computing technology, a distributed computing technology, or a client-server computing technology may be used.

Figure 12:
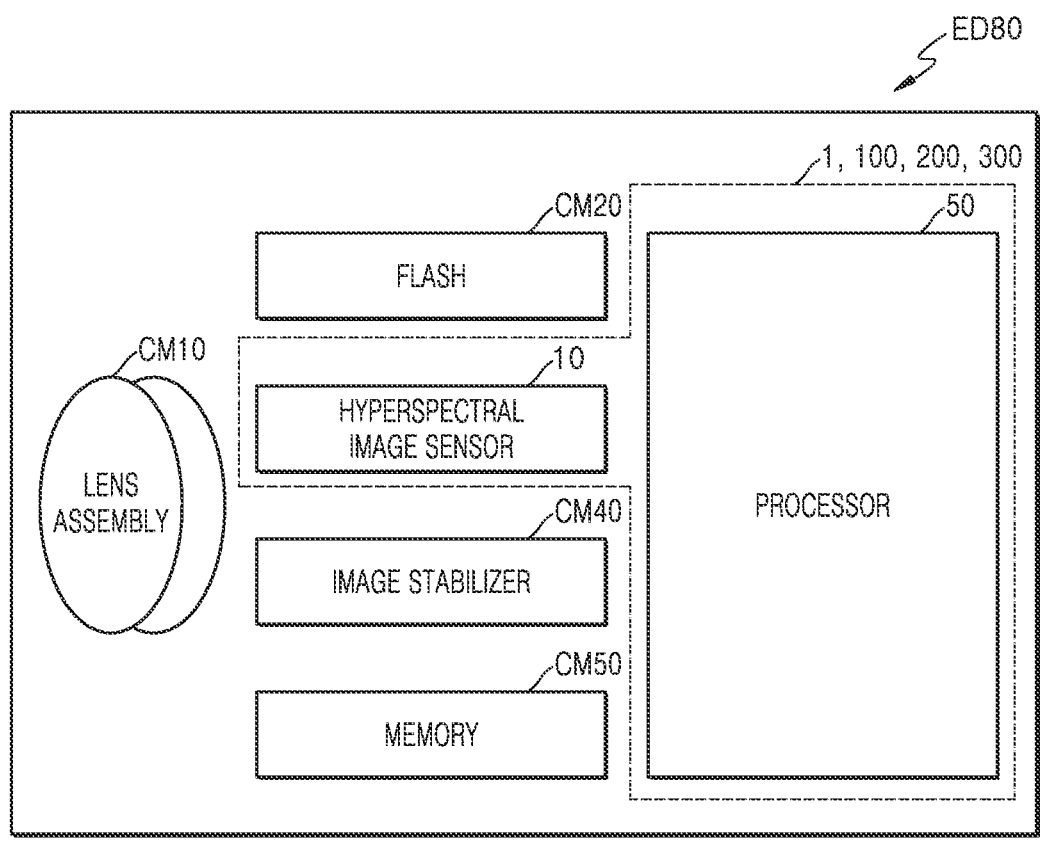
FIG. 12 is a block diagram illustrating a camera module of FIG. 11.

FIG. 12 is a block diagram of the camera module ED80 of FIG. 11.

Referring to FIG. 12, the camera module ED80 may include a lens assembly CM10, a flash CM20, the image acquisition apparatus 1, 100, 200, or 300, an image stabilizer CM40, and a memory CM50 (a buffer memory, and the like). FIG. 12 illustrates an example in which the structure of FIG. 1 is applied to the image acquisition apparatuses 1, 100, 200, and 300. Not only the structure of FIG. 1 but also one of the structures of FIGS. 8 through 10 may be applied as the image acquisition apparatuses 1, 100, 200, and 300. The lens assembly CM10 may collect light emitted from a subject for image capturing. The camera module ED80 may include a plurality of lens assemblies CM10, and in this case, the camera module ED80 may be a dual camera, a 360 degrees camera, or a spherical camera. Some of the lens assemblies CM10 may have the same lens attributes (a viewing angle, a focal length, auto focus, F Number, optical zoom, and the like), or different lens attributes. The lens assembly CM10 may include a wide angle lens or a telescopic lens.

The flash CM20 may emit light used to enhance light emitted or reflected from a subject. The flash CM20 may include one or a plurality of light-emitting diodes (a red-green-blue (RGB) LED, a white LED, an infrared LED, an ultraviolet LED, and the like), and/or a xenon lamp. As described above with reference to FIGS. 1 and 8 through 10, the image acquisition apparatus 1, 100, 200, or 300 may acquire an image corresponding to the subject and form an image in which the color of the object and the background are corrected under a multi-illumination environment, by converting light emitted or reflected from the subject and transmitted through the lens assembly CM10 into electrical signals by using a hyperspectral image sensor. The image acquisition apparatus 1, 100, 200, or 300 may include one or a plurality of sensors selected from image sensors having different attributes such as an RGB sensor, a black and white (BW) sensor, an IR sensor, or a UV sensor. Each of the sensors included in the image acquisition apparatuses 1, 100, 200, and 300 may be implemented by a charged coupled device (CCD) sensor and/or a complementary metal oxide semiconductor (CMOS) sensor.

The image stabilizer CM40 may move, in response to a movement of the camera module ED80 or an electronic device ED01 including the same, one or a plurality of lenses included in the lens assembly CM10 or an image sensor in a particular direction or may compensate for a negative effect due to the movement by controlling (adjusting a read-out timing, and the like) the movement characteristics of the hyperspectral image sensor 10, 210, or 1000 of the image acquisition apparatuses 1, 100, 200, or 300. The image stabilizer CM40 may detect a movement of the camera module ED80 or the electronic device ED01 by using a gyro sensor (not shown) or an acceleration sensor (not shown) arranged inside or outside the camera module ED80. The image stabilizer CM40 may be implemented in an optical form.

The memory CM50 may store a part or entire data of an image acquired through the image acquisition apparatus 1, 100, 200, or 300 for a subsequent image processing operation. For example, when a plurality of images are acquired at high speed, the acquired original data (Bayer-Patterned data, high resolution data, and the like) is stored in the memory CM50 and only low resolution images are displayed. Then, the memory CM50 may be used to transmit the original data of a selected (user selection, and the like) image to the processor 50 of the image acquisition apparatus 1, 100, 200, or 300. The memory CM50 may be incorporated into the memory ED30 of the electronic device ED01, or configured to be an independently operated separate memory.

The processor 50 may perform image processing on the image obtained through the hyperspectral image sensor 10, 210, or 1000 or the image data stored in the memory CM50. The image processing may include color correction of the object and the background, depth map generation, 3D modeling, panorama generation, feature point extraction, image synthesis, and/or image compensation (noise reduction, resolution adjustment, brightness adjustment, blurring, sharpening, softening, and the like). The processor 50 may perform control (exposure time control, or read-out timing control, and the like) on components (the hyperspectral image sensor 10, 210, or 1000, and the like) included in the camera module ED80. The image processed by the processor 50 may be stored again in the memory CM50 for additional processing or provided to external components (the memory ED30, the display apparatus ED60, the electronic device ED02, the electronic device ED04, the server ED08, and the like) of the camera module ED80. The processor 50 may be incorporated into the processor ED20, or configured to be a separate processor operated independently of the processor ED20. When the processor 50 is configured by a separate processor from the processor ED20, the image processed by the processor 50 may undergo additional image processing by the processor ED20 and then displayed through the display apparatus ED6.

The electronic device ED01 may include a plurality of camera modules ED80 having different attributes or functions. In this case, one of the plurality of camera modules ED80 may be a wide angle camera, and another may be a telescopic camera. Similarly, one of the plurality of camera modules ED80 may be a front side camera, and another may be a rear side camera.

Figure 13:
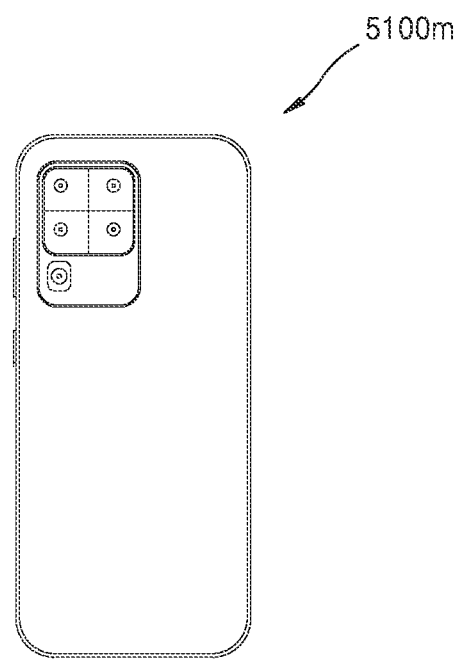
FIGS. 13, 14, 15, 16, 17, 18, 19, 20, 21, and 22 illustrate various examples of electronic devices to which image acquisition apparatuses according to example embodiments are applied.
Figure 14:
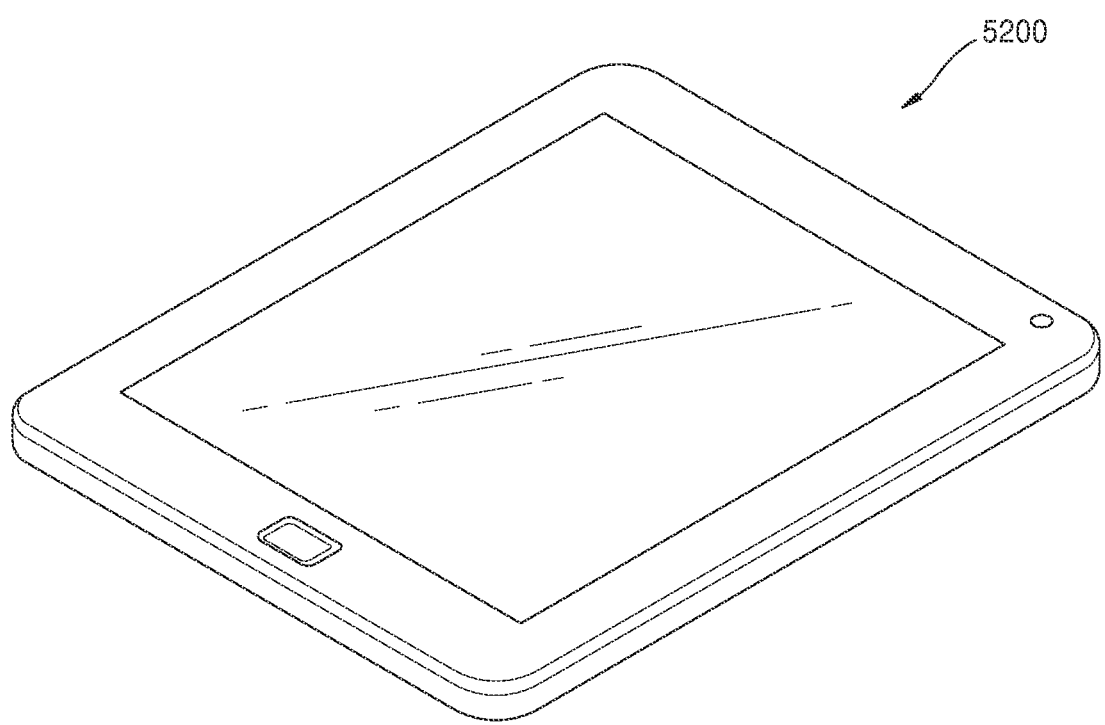
Figure 15:
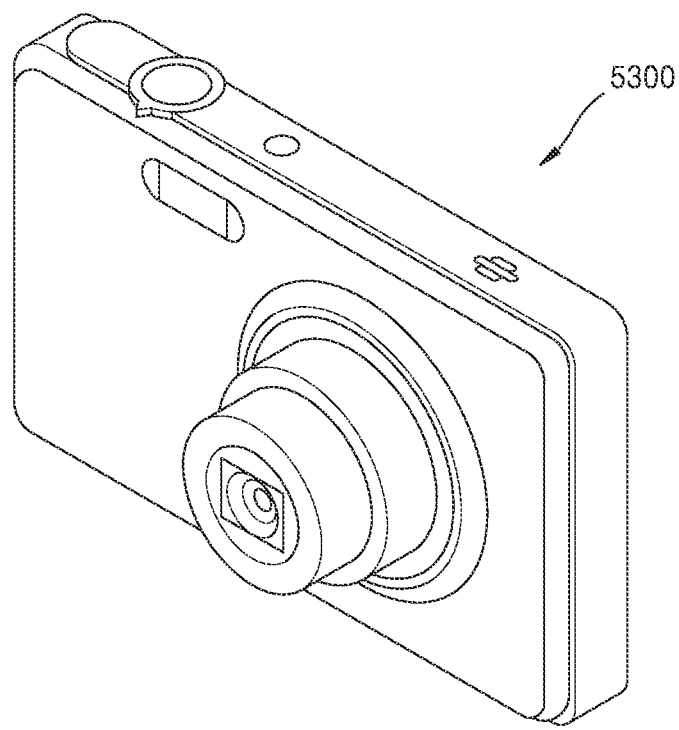
Figure 16:
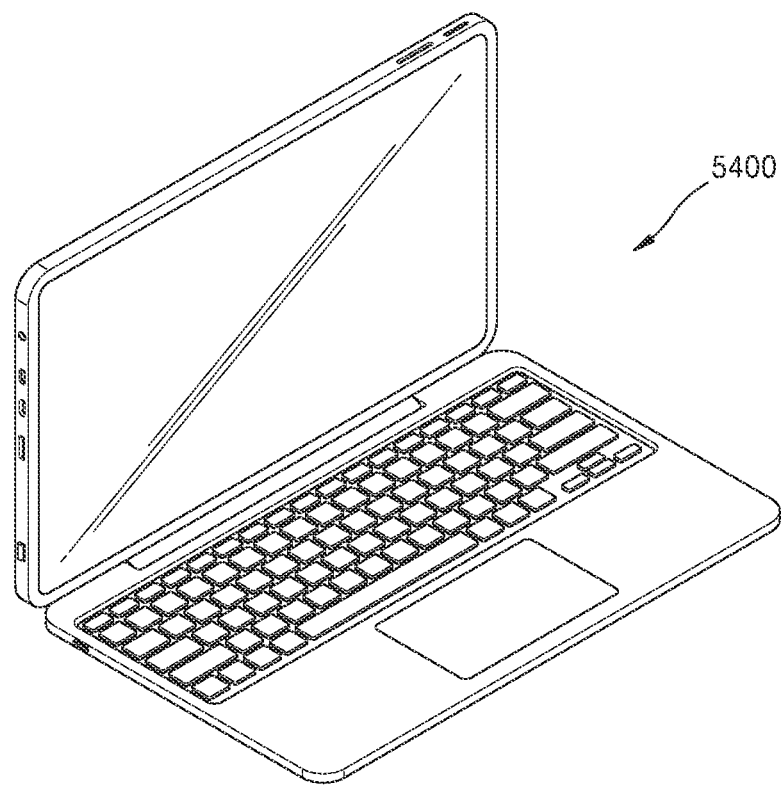
Figure 17:
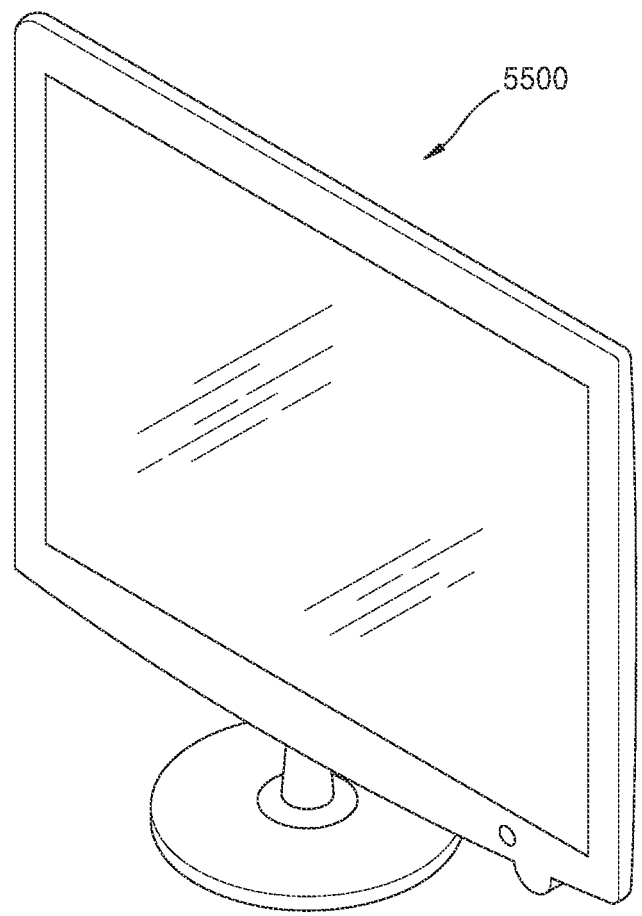

The image acquisition apparatus 1, 100, 200, or 300 according to example embodiments may be applied to a mobile phone or smartphone 5100m illustrated in FIG. 13, a tablet or smart tablet 5200 illustrated in FIG. 14, a digital camera or camcorder 5300 illustrated in FIG. 15, a notebook computer 5400 illustrated in FIG. 16, a television or smart television 5500 illustrated in FIG. 17, and the like. For example, the smartphone 5100m or the smart tablet 5200 may include a plurality of high resolution cameras, each having a high resolution image acquisition apparatus 1, 100, 200, or 300 mounted thereon. By using high resolution cameras, depth information of subjects in an image may be extracted, out focusing of the image may be adjusted, or subjects in the image may be automatically identified.

Figure 18:
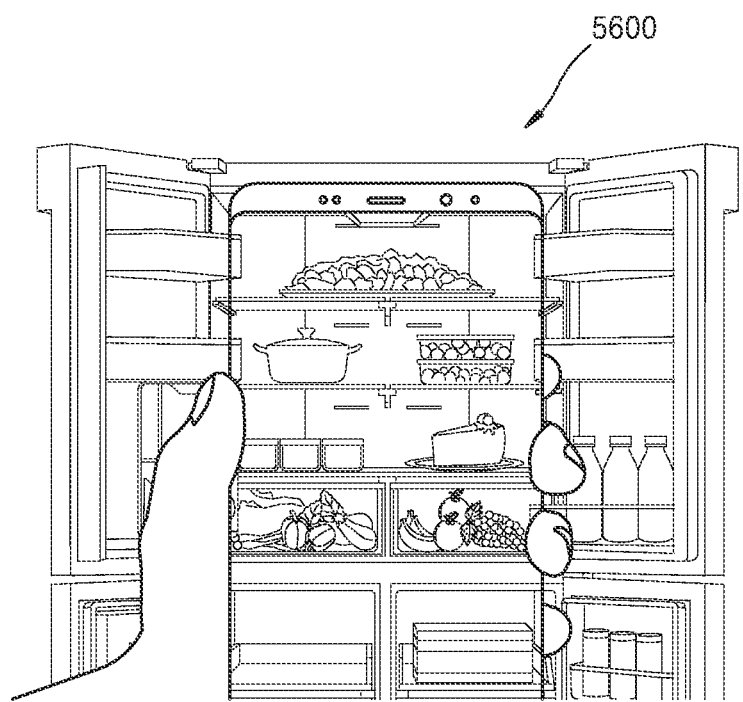
Figure 19:
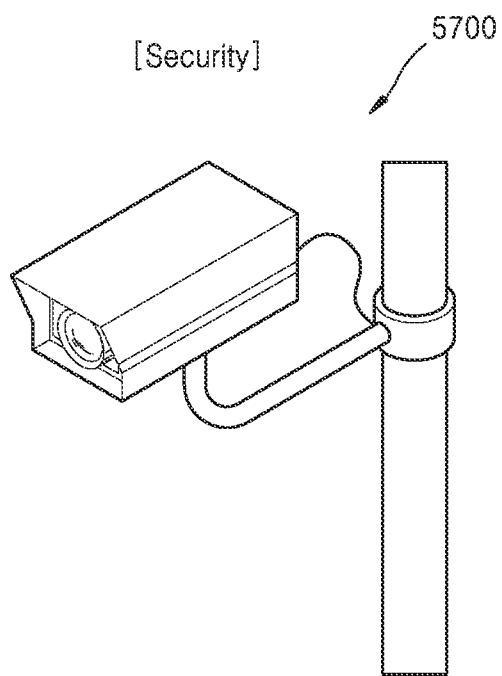
Figure 20:
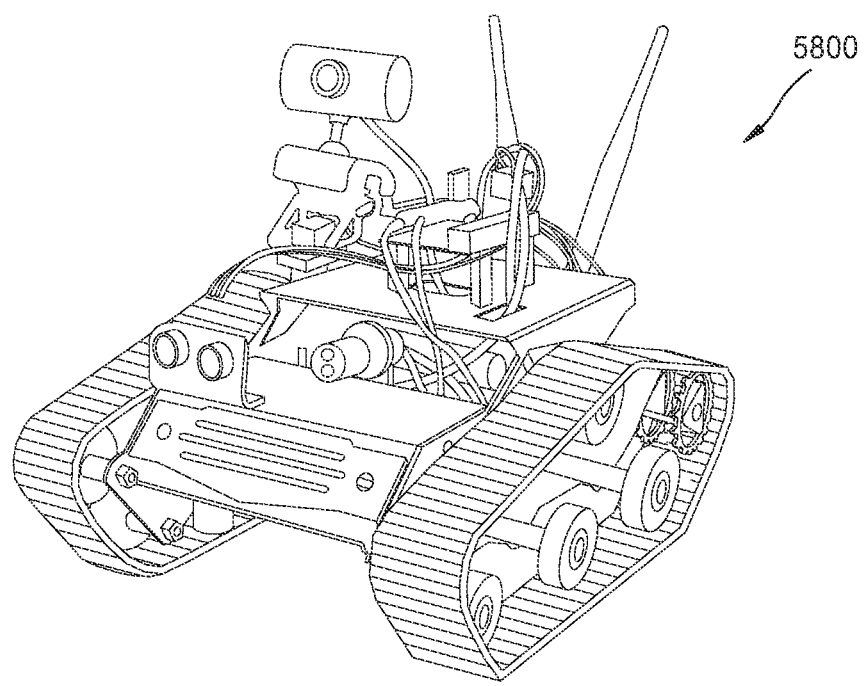
Figure 21:
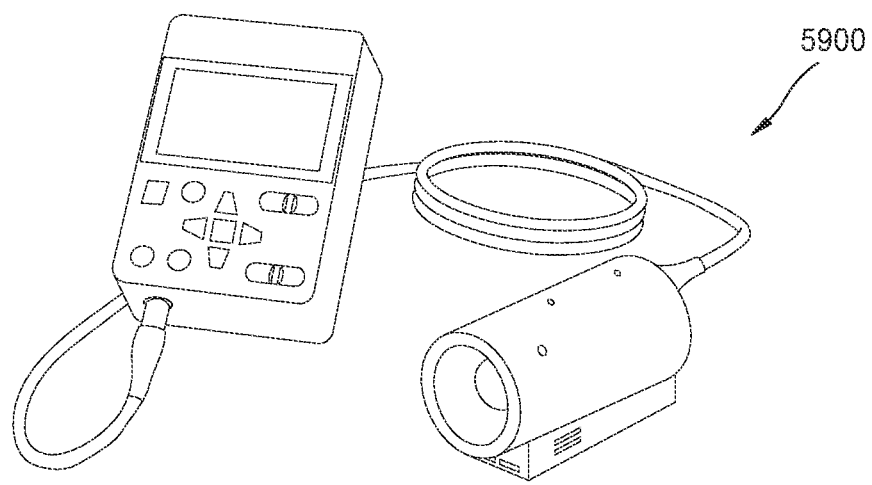

Furthermore, the image acquisition apparatus 1, 100, 200, or 300 may be applied to a smart refrigerator 5600 illustrated in FIG. 18, a security camera 5700 illustrated in FIG. 19, a robot 5800 illustrated in FIG. 20, a medical camera 5900 illustrated in FIG. 21, and the like. For example, the smart refrigerator 5600 may automatically recognize food in a refrigerator, by using the image acquisition apparatus 1, 100, 200, or 300, and notify a user of the presence of a particular food, the type of food that is input or output, and the like, through a smartphone. The security camera 5700 may provide an ultrahigh resolution image and may recognize an object or a person in an image in a dark environment by using high sensitivity. The robot 5800 may be provided in a disaster or industrial site that is not directly accessible by people, and may provide a high resolution image. The medical camera 5900 may provide a high resolution image for diagnosis or surgery, and dynamically adjust a field of vision.

Figure 22:
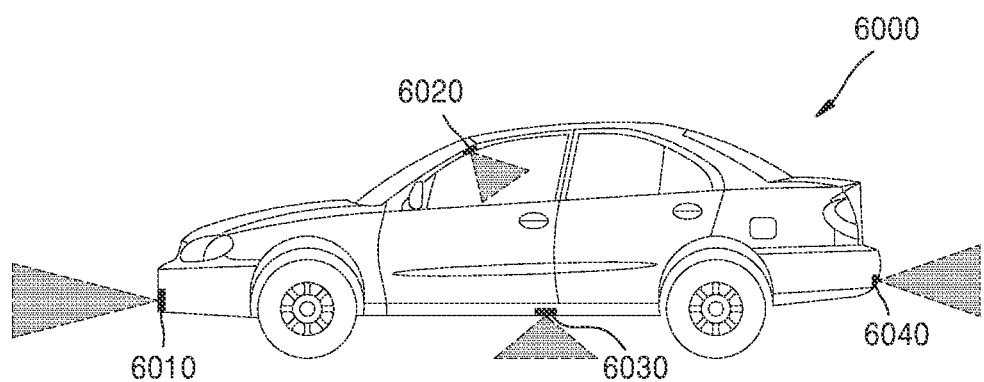

The image acquisition apparatus 1, 100, 200, or 300 may be applied to a vehicle 6000 as illustrated in FIG. 22. The vehicle 6000 may include a plurality of vehicle cameras 6010, 6020, 6030, and 6040 arranged at various positions. Each of the vehicle cameras 6010, 6020, 6030, and 6040 may include the image acquisition apparatus 1, 100, 200, or 300 according to an example embodiment. The vehicle 6000 may provide a driver with various pieces of information about the inside or periphery of the vehicle 6000, by using the vehicle cameras 6010, 6020, 6030, and 6040, and may provide information needed for autonomous driving by automatically recognizing an object or a person in an image.

In an image acquisition apparatus, an image acquisition method, and an electronic device including the same, according to an example embodiment, an object and a background may be distinguished from an image by applying hyperspectral imaging, multi-illumination components may be analyzed by obtaining the spatial distribution of an illumination by analyzing an illumination shining the same object, and the color of the object and the background may be corrected using the spatial distribution of illuminations.

Although the image acquisition apparatuses 1, 100, 200, and 300 and electronic devices including the same have been described above with reference to the example embodiments illustrated in the drawings, the illustrated example embodiments are only examples, and various modifications to the illustrated example embodiments and other equivalent embodiments may be possible. Thus, the disclosed example embodiments should be considered in a descriptive sense only and not for purposes of limitation. The scope of the present disclosure is defined not by the detailed description of the disclosure but by the appended claims, and all differences within the scope will be construed as being included in the present disclosure.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An image acquisition apparatus comprising:
    a first hyperspectral image sensor configured to obtain a first image;
    a second hyperspectral image sensor configured to obtain a second image; and
    a processor configured to process the first image obtained by the first hyperspectral image sensor,
    wherein the processor is further configured to:
        extract a first spectrum of each pixel of the first image obtained by the first hyperspectral image sensor;
        correct the first spectrum by normalizing the first spectrum of each pixel;
        distinguish an object from a background within the first image by recognizing a pattern of the first spectrum of each pixel;
        correct a color of the object and a color of the background by using a spatial distribution of illuminations;
        obtain an average value of a second spectrum of each pixel of the second image obtained by the second hyperspectral image sensor; and
        apply the average value of the second spectrum of each pixel of the second image obtained by the second hyperspectral image sensor to an illumination spectrum used to correct the first spectrum by normalizing the first spectrum of each pixel.

2. The image acquisition apparatus of claim 1, wherein the processor is further configured to:
    obtain an average value of the first spectrum of each pixel;
    consider the obtained first spectrum as an average illumination spectrum of the entire first image.

3. The image acquisition apparatus of claim 1, wherein the processor is further configured to analyze a spatial distribution of an illumination on a background formed of a same material.

4. The image acquisition apparatus of claim 3, further comprising an illumination sensor configured to analyze the spatial distribution of the illumination.

5. The image acquisition apparatus of claim 4, wherein the illumination sensor comprises a radar sensor configured to calculate the spatial distribution of the illumination based on location by measuring a material distribution within a three-dimensional (3D) space.

6. An electronic device comprising:
an image acquisition apparatus comprising:
a first hyperspectral image sensor configured to obtain an image;
a second hyperspectral image sensor configured to obtain a second image; and
a processor configured to process the image obtained by the first hyperspectral image sensor,
wherein the processor is further configured to:
extract a first spectrum of each pixel of the image obtained by the first hyperspectral image sensor;
correct the first spectrum by normalizing the first spectrum of each pixel;
distinguish an object from a background within the image by recognizing a pattern of the first spectrum of each pixel;
correct a color of the object and a color of the background by using a spatial distribution of illuminations;
obtain an average value of a second spectrum of each pixel of the second image obtained by the second hyperspectral image sensor; and
apply the average value of the second spectrum of each pixel of the second image obtained by the second hyperspectral image sensor to an illumination spectrum used to correct the first spectrum by normalizing the first spectrum of each pixel.

7. The electronic device of claim 6, wherein the electronic device comprises a mobile phone, a smartphone, a tablet, a smart tablet, a digital camera, a camcorder, a notebook computer, a television, a smart television, a smart refrigerator, a security camera, a robot, or a medical camera.

8. An image acquisition method comprising:
obtaining a first image by using a first hyperspectral image sensor; and
processing the first image obtained by the first hyperspectral image sensor,
wherein the processing of the obtained first image comprises:
extracting a first spectrum of each pixel of the first image obtained by the first hyperspectral image sensor;
correcting the first spectrum by normalizing the first spectrum of each pixel;
distinguishing an object from a background within the first image by recognizing a pattern of the first spectrum of each pixel; and
correcting a color of the object and a color of the background based on a spatial distribution of illuminations;
obtaining a second image based on a second hyperspectral image sensor,
wherein an average value of a second spectrum of each pixel of the second image is applied as an illumination average value to correct the first spectrum by normalizing the first spectrum of each pixel.

9. The image acquisition method of claim 8, wherein the correcting of the first spectrum by normalizing the first spectrum of each pixel comprises:
obtaining an average value of the first spectrum of each pixel;
considering the obtained spectrum as an average illumination spectrum of the entire first image; and
applying the obtained spectrum as an illumination average value.

10. The image acquisition method of claim 8, further comprising analyzing the spatial distribution of the illumination.

11. The image acquisition method of claim 10, further comprising measuring a material distribution within a three-dimensional (3D) space by a radar sensor to obtain the spatial distribution of the illumination based on location.

12. The image acquisition method of claim 11, further comprising analyzing a spatial distribution of an illumination on a background formed of a same material, by using the radar sensor and the second hyperspectral image sensor.

13. The image acquisition method of claim 8, further comprising analyzing a spatial distribution of an illumination on a background formed of a same material.

14. The image acquisition method of claim 13, further comprising analyzing the spatial distribution of the illumination by using an illumination sensor.

15. The image acquisition method of claim 14, wherein the illumination sensor comprises a radar sensor configured to obtain the spatial distribution of the illumination based on location by measuring a material distribution within a three-dimensional (3D) space.

* * * * *